United States Patent
Chang

(10) Patent No.: US 11,462,206 B2
(45) Date of Patent: Oct. 4, 2022

(54) APPARATUS AND METHOD FOR GENERATING SOUND OF VEHICLE

(71) Applicants: HYUNDAI MOTOR COMPANY, Seoul (KR); KIA MOTORS CORPORATION, Seoul (KR)

(72) Inventor: Kyoung Jin Chang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/217,304

(22) Filed: Mar. 30, 2021

(65) Prior Publication Data
US 2022/0084498 A1 Mar. 17, 2022

(30) Foreign Application Priority Data
Sep. 16, 2020 (KR) .................. 10-2020-0119377

(51) Int. Cl.
| G10K 15/02 | (2006.01) |
| H04R 1/02 | (2006.01) |
| B60Q 5/00 | (2006.01) |

(52) U.S. Cl.
CPC ............. *G10K 15/02* (2013.01); *B60Q 5/008* (2013.01); *H04R 1/025* (2013.01); *H04R 2499/13* (2013.01)

(58) Field of Classification Search
CPC ........ G10K 15/02; B60Q 5/008; H04R 1/025; H04R 2499/13
See application file for complete search history.

(56) References Cited

U.S. PATENT DOCUMENTS

| 2010/0134058 A1 | 6/2010 | Nagashima et al. |
| 2011/0087403 A1 | 4/2011 | Fujikawa |
| 2014/0152206 A1 | 6/2014 | Kimpara et al. |
| 2018/0114445 A1 | 4/2018 | Jang et al. |
| 2021/0044236 A1 | 2/2021 | Chang |
| 2021/0309147 A1 | 10/2021 | Chang et al. |
| 2021/0379998 A1* | 12/2021 | Lee ................ G10K 15/04 |

FOREIGN PATENT DOCUMENTS

| CN | 113497997 A * | 10/2021 | ............ B60Q 5/008 |
| KR | 10-2021-0017699 A | 2/2021 | |
| KR | 10-2021-0123677 A | 10/2021 | |

OTHER PUBLICATIONS

Office Action issued in corresponding U.S. Appl. No. 16/944,807 dated May 20, 2022.

* cited by examiner

*Primary Examiner* — David L Ton
(74) *Attorney, Agent, or Firm* — Morgan, Lewis & Bockius LLP

(57) ABSTRACT

An apparatus of generating a sound of a vehicle includes a motor configured to generate a torque of a rotational component and a torque of a vibration component, based on a target driving current, a controller configured to generate the target current by synthesizing a first signal for generating the torque of the rotational component and a second signal for generating the torque of the vibration component, and determine the target driving current for driving the motor based on the target current, and a sound output device to generate a target sound due to the torque of the vibration component.

19 Claims, 17 Drawing Sheets

APPARATUS AND METHOD FOR GENERATING SOUND OF VEHICLE

CROSS-REFERENCE TO RELATED APPLICATION

The present application claims priority to Korean Patent Application No. 10-2020-0119377, filed on Sep. 16, 2020, the entire contents of which is incorporated herein for all purposes by this reference.

BACKGROUND OF THE INVENTION

Field of the Invention

The present invention relates to an apparatus and a method for generating a sound of a vehicle.

Description of Related Art

Since an electric vehicle using electricity does not generate an engine sound when driving, the electric vehicle needs to have a virtual engine sound system, which generates a virtual engine sound, for the safety of a pedestrian such that the pedestrian recognizes a vehicle approaching the pedestrian when the vehicle is running.

However, since such a system may have a separate speaker or an electric vibrator (a vibration inducing device) to generate a sound, the weight of the vehicle may be increased and the cost may be increased. Accordingly, there is required the development of a technology of generating various sounds without increasing the costs and the weight of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for generating a sound of a vehicle, configured for generating various virtual engine sounds by utilizing a motor basically provided in a vehicle without the increase in the weight and the costs of the vehicle.

The technical problems to be solved by the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of generating a sound of a vehicle, may include a motor configured to generate a torque of a rotational component and a torque of a vibration component, based on a target driving current, a controller configured to generate the target current by synthesizing a first signal for generating the torque of the rotational component and a second signal for generating the torque of the vibration component, and determine the target driving current for driving the motor based on the target current, and a sound output device to generate a target sound due to the torque of the vibration component.

The controller may include a target signal processor to output the target current, a proportional and integral (PI) controller to perform a PI control operation for a value obtained by subtracting a feedback current, which is received from the motor, from the target current, a pulse width modulation (PWM) controller to change a pulse width of a current subject to the PI control operation, and a motor driver to determine the target driving current for driving the motor, based on the current having the changed pulse width, and to output the determined target driving current to the motor.

The target signal processor may determine a target signal for controlling an operation of a wiper, based on wiper operating information, and may generate the first signal by extracting a direct current (DC) component from the target signal.

The target signal processor may determine a target signal for controlling an operation of a cooling fan, based on cooling fan operating information, and may generate the first signal by extracting a direct current (DC) component from the target signal.

The target signal processor may generate a variable sound signal for controlling the motor based on driving information, and generate the second signal by extracting an alternating current (AC) component from the variable sound signal.

The target signal processor may include a basic sound signal forming device configured to set a driving variable, which is to be linked to a frequency of the target sound, of the driving information, set the number of tone colors of the target sound to "n", and set a basic frequency and a basic size of each tone color, and a diving variable-linked sound forming device configured to set frequency variable ratios for a minimum value and a maximum value of the driving variable, form "n" target sound signals for the "n" tone colors, based on one of the frequency variable ratios, a sound volume weighting function depending on the driving variable, a sound volume weighting function depending on a torque change, and a sound volume weighting function depending on a degree of pressing an accelerator pedal, and generate the variable sound signal by synthesizing the "n" target sound signals.

The driving variable may include one of a vehicle speed, an engine revolutions per minute (RPM), and a motor RPM.

The motor may operate a wiper or a cooling fan due to the torque of the rotational component.

According to various aspects of the present invention, a method for generating a sound of a vehicle may include generating a target current by synthesizing a first signal for generating torque of a rotational component and a second signal for generating torque of a vibration component, determining a target driving current for driving a motor based on the target current, and generating a target sound due to the torque of the vibration component of the torque of the rotational component and torque of the vibration component, which are generated from the motor based on the target driving current.

The generating of the target current may include determining a target signal for controlling an operation of a wiper, based on wiper operating information, and generating the first signal by extracting a DC component from the target signal.

The generating of the target current may include determining a target signal for controlling an operation of a cooling fan, based on cooling fan operating information, and generating the first signal by extracting a DC component from the target signal.

The generating of the target current may include generating a variable sound signal for controlling the motor, based on driving information, and generating the second signal by extracting an AC component from the variable sound signal.

The generating of the variable sound signal may include setting a driving variable, which is to be linked to a frequency of the target sound, of the driving information, setting the number of tone colors of the target sound to "n", setting a basic frequency and a basic size of each tone color, setting frequency variable ratios for a minimum value and a maximum value of the driving variable, forming "n" target sound signals for the "n" tone colors, based on one of the frequency variable ratio, a sound volume weighting function set depending on the driving variable, a sound volume weighting function depending on a torque change, and a sound volume weighting function depending on a degree of pressing an accelerator pedal, and generating the variable sound signal by synthesizing the "n" target sound signals.

The driving variable may include one of a vehicle speed, an engine RPM, and a motor RPM.

The determining of the target driving current may include performing a PI control operation for a value obtained by subtracting a feedback current, which is received from the motor, from the target current, changing a pulse width of a current subject to the PI control operation, and determining the target driving current for driving the motor, based on the current having the changed pulse width.

The method may further include operating the wiper or the cooling fan due to the torque of the rotational component.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
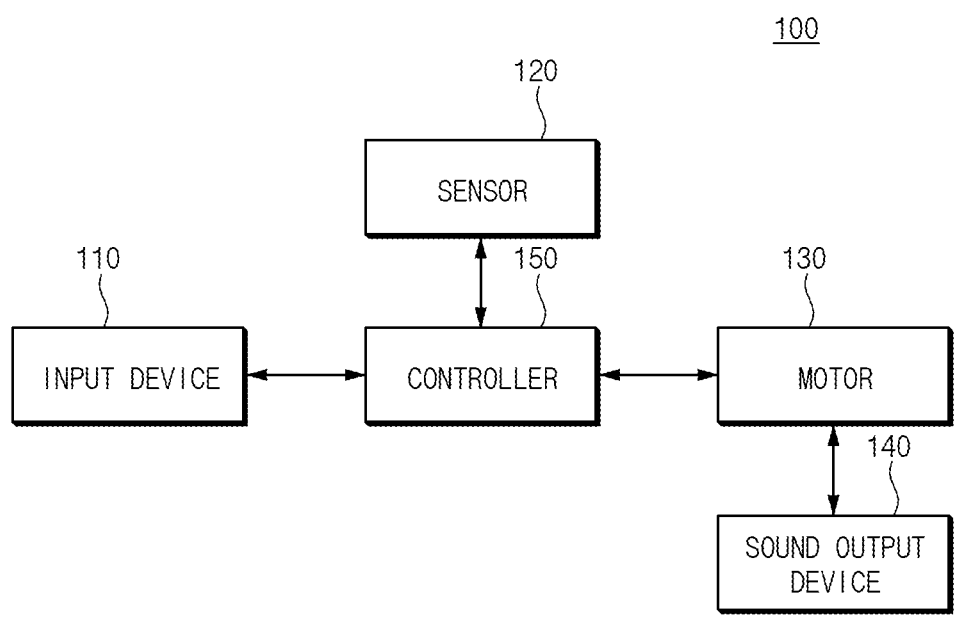
FIG. 1 is a block diagram illustrating the configuration of an apparatus of generating a sound of a vehicle, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

Furthermore, in the following description of components according to various exemplary embodiments of the present invention, the terms 'first', 'second', 'A', 'B', '(a)', and '(b)' may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the configuration of an apparatus of generating a sound of a vehicle, according to various exemplary embodiments of the present invention.

As illustrated in FIG. 1, an apparatus 100 for generating the sound of the vehicle may include an input device 110, a sensor 120, a motor 130, a sound output device 140, and a controller 150.

The input device 110 may generate a relevant operation signal depending on the manipulation of a user or the motion of the user. According to various exemplary embodiments of the present invention, the input device 110 may include a wiper switch which is configured to operate a wiper.

The sensor 120 may include a driving sensor 121 and a cooling fan sensor 122-0 to acquire driving information related to the vehicle. In the instant case, the driving information is information acquired by the vehicle while the vehicle is running. The driving sensor 121 may acquire a vehicle speed, a torque, an engine revolutions per minute (RPM), and a motor RPM. Furthermore, the cooling fan sensor 122-0 may acquire an engine temperature and a coolant temperature.

The motor 130 may generate a torque of a rotational component and a torque of a vibration component, based on a target driving current generated by the controller 150. According to various exemplary embodiments of the present invention, the motor 130 may include a wiper driving motor and a cooling fan driving motor. The torque of a rotational component generated from the motor 130 is to rotate a wiper by rotating a rotation link of the wiper, or to rotate a blade of a cooling fan. The torque of the vibration component generated from the motor 130 may generate a target sound of the vehicle by vibrating the sound output device 140.

The sound output device 140 may output the target sound of the vehicle through vibration caused by the torque of the vibration component from the motor 130. The sound output device 140 may include a panel mounting device 141 and a vibration panel 142 which may be connected to the motor 130. The vibration panel 142 may be designed to have a higher radiation efficiency, as compared to a conventional vehicle body panel such that a sufficient volume of radiation sound is generated. Furthermore, the vibration panel 142 may be designed to increase the modulus of elasticity and to have a smaller mass and a thinner thickness, as compared to the existing vehicle body panel. In addition, the vibration panel 142 may be designed without no beads or ribs interrupting the vibration, and the area of the vibration panel 142 may be at least 100 times or more (e.g., 200 times to 500 times) of the thickness thereof.

According to various exemplary embodiments of the present invention, the vibration panel 142 may be connected by the panel mounting device 141 connected to a wiper gear box, and may include a cowl top panel. Furthermore, the vibration panel 142 may be connected by the panel mounting device 141, in a form of radiating from one side of the cooling fan motor. According to various exemplary embodiments of the present invention, the panel mounting device 141 may be provided at a position where the vibration of the vibration panel 142 may be easily generated due to the vibration torque from the motor. For example, the panel mounting device 141 may be provided at a position where vibration is largely generated in the direction of centrifugal force of the motor 130, that is, near a center portion of a housing of the motor (a case surrounding the motor).

In more detail, the vibration panel 142 provided in the cooling fan motor will be described with reference to FIG. 9B.

The controller 150 may be implemented by various processing devices, such as a microprocessor embedded therein with a semiconductor chip to operate or execute various instructions, and may control the operation of the apparatus 100 for generating the sound of the vehicle, based on at least one algorithm stored in a storage.

The controller 150 generates a target current by synthesizing a first signal for generating the torque of the rotational component from the motor 130 and a second signal for generating the torque of the vibration component from the motor 130, and may determine a target driving current for driving the motor 130 based on the target current. The controller 150 will be described later in more detail with reference to FIGS. 2 to 6.

Figure 2:
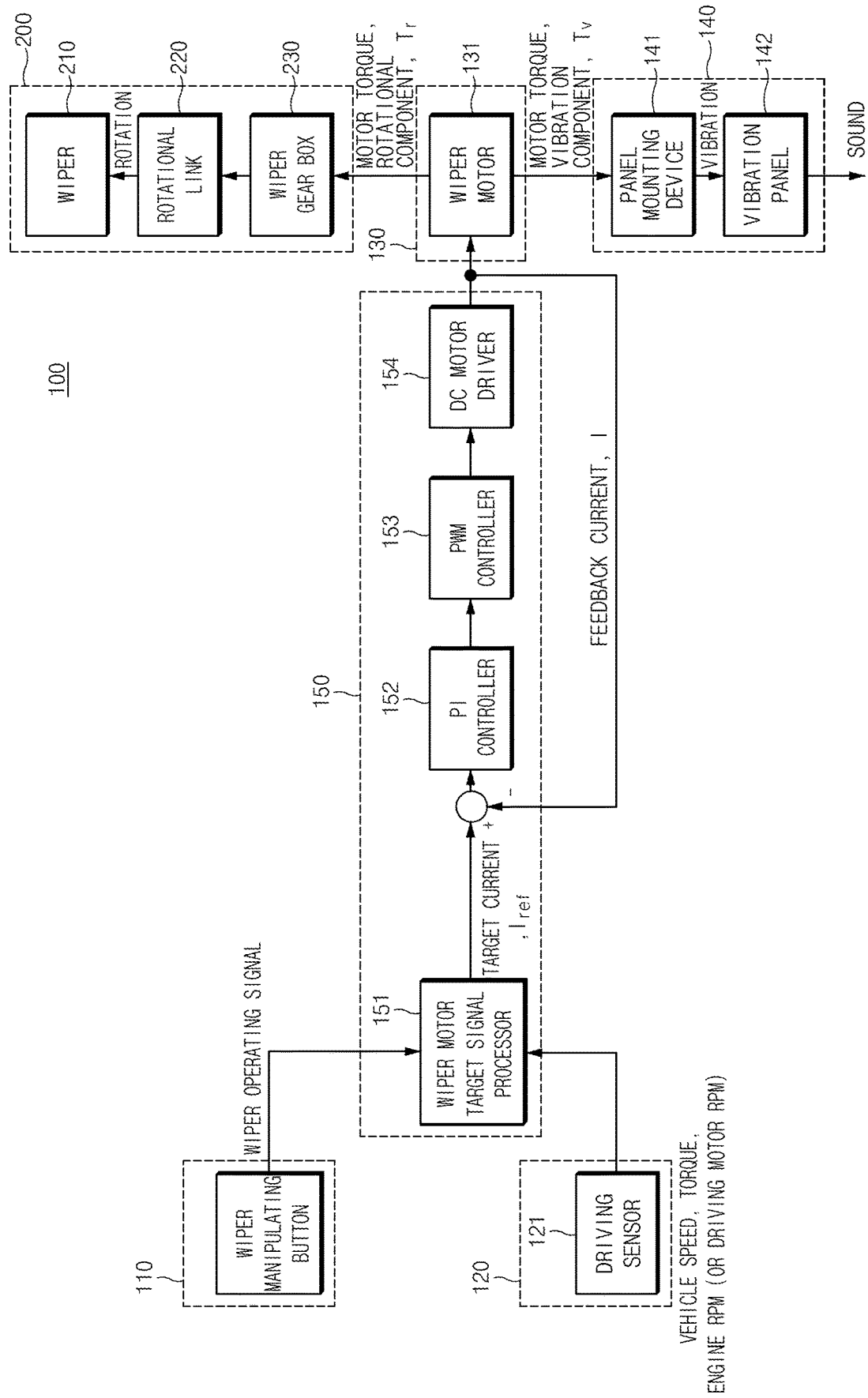
FIG. 2 is a view exemplarily illustrating the configuration of an apparatus of generating the sound of a vehicle and a signal flow, according to various exemplary embodiments of the present invention.

FIG. 2 is a view exemplarily illustrating the configuration of an apparatus of generating a sound of a vehicle and a signal flow thereof, according to various exemplary embodiments of the present invention.

As illustrated in FIG. 2, according to various exemplary embodiments of the present invention, the apparatus 100 for generating the sound of the vehicle may include the controller 150 to output a target current ($I_{ref}$) based on a wiper operating signal which is generated from the input device 110 and the driving information obtained from the driving sensor 121, a wiper motor 131 driven, as the target current is applied to the wiper motor 131, the sound output device 140 to output a sound, as the torque of the vibration component from the wiper motor 131 is applied, and a wiper driving device 200 to drive the wiper, as the torque of the rotational component from the wiper motor 131 is applied.

The controller 150 may include a wiper motor target signal processor 151, which outputs the target current ($I_{ref}$) based on the wiper operating signal and the driving information, a PI controller 152, which performs a Proportional and integral (PI) control operation for a value by subtracting a feedback current (I) received from the motor 130 (the wiper motor 131) from the target current, a Pulse Width Modulation (PWM) controller 153, which changes the pulse width of the current, which is obtained by subtracting the feedback current from the target current, to convert the amount of a current for driving the motor 130 (wiper motor 131), and a DC motor driver 154 which determines a target driving current of the motor 130 (wiper motor 131) based on the target current having the changed pulse width, and outputs the determined target driving current to the motor 130 (wiper motor 131). The wiper motor target signal processor 151 will be described in more detail with reference to FIG. 5.

The motor 130 including the wiper motor 131 may be driven by the target driving current output from the controller 150, and may generate a motor torque including a rotational component (Tr) and a vibration component (Tv). The torque of the rotational component generated from the wiper motor 131 is transmitted to a wiper gear box 230, and the torque transmitted to the wiper gear box 230 is applied to operate a rotation link 220, and a wiper 210 is operated by the operation of the rotation link 220. Furthermore, the torque of the vibration component generated from the wiper motor 131 is transmitted to the panel mounting device 141, and the torque transmitted to the panel mounting device 141 vibrates the vibration panel 142 to generate a target sound.

Figure 3:
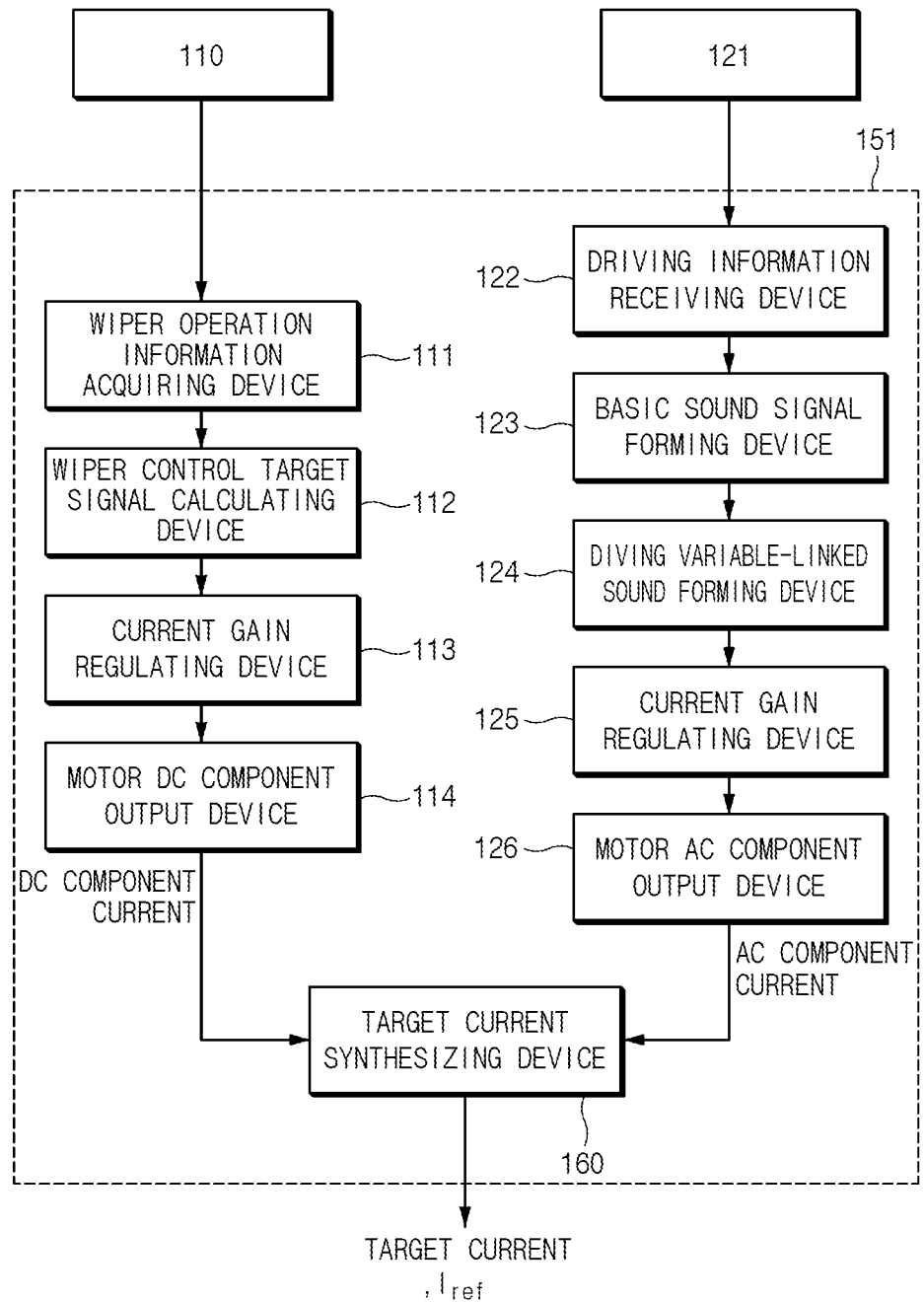
FIG. 3 is a view exemplarily illustrating the configuration of a wiper motor target signal processor and a signal flow thereof, according to various exemplary embodiments of the present invention.

FIG. 3 is a view exemplarily illustrating the configuration of a wiper motor target signal processor and a signal flow thereof, according to various exemplary embodiments of the present invention.

As illustrated in FIG. 3, the wiper motor target signal processor 151 may generate the first signal for generating the torque of the rotational component from the motor (wiper motor), based on the wiper operating information received from the input device 110, and may generate the second signal for generating the torque of the vibration component of the motor (wiper motor), based on the driving information from the driving sensor 121. Furthermore, the wiper motor target signal processor 151 may generate the target current by synthesizing the first signal and the second signal.

In more detail, the wiper motor target signal processor 151 may include a wiper operating information acquiring device 111, which receives the wiper operating signal from the input device 110 to acquire the wiper operating information including an On/Off state of the wiper and a setting value for a wiper operating intensity, a wiper control target signal calculating device 112, which determines a target signal for controlling the wiper to adjust the size and the frequency of a control signal of the motor (wiper motor) based on the wiper operating information, a current gain regulating device 113, which regulates a current gain to amplify the output current, and a motor DC component output device 114, which outputs a direct current (DC) component of the current, and may generate the first signal using the above components. In the instant case, the motor DC component output device 114 may automatically extract a DC component, when noise is not involved into the target value. However, when the noise is involved into the target value, a low pass filter is added to output a current having the DC component.

Furthermore, the wiper motor target signal processor 151 may include a driving information receiving device 122, which receives driving information (a vehicle speed, a torque, or an engine RPM (or a motor RPM)) from the driving sensor 121, a basic sound signal forming device 123, which forms a basic sound signal based on the driving information, a diving variable-linked sound forming device 124, which forms a variable sound signal based on the basic sound signal, a current gain regulating device 125, which regulates a current gain to amplify an output current, and a motor AC component output device 126, which outputs an Alternative Current (AC) component of the current, and may generate the second signal by use of the above-described components. In the instant case, the motor AC component output device may automatically extract the AC component when the noise is not involved in the target value. However, when the noise is involved in the target value, a high-pass filter is added to output a current having an AC component. The basic sound signal forming device 123 and the diving variable-linked sound forming device 124 will be described later in more detail with reference to FIG. 6 and FIG. 7.

Furthermore, the wiper motor target signal processor 151 may include a target current synthesizing device 160 which generates the target current by synthesizing the first signal and the second signal.

Figure 4:
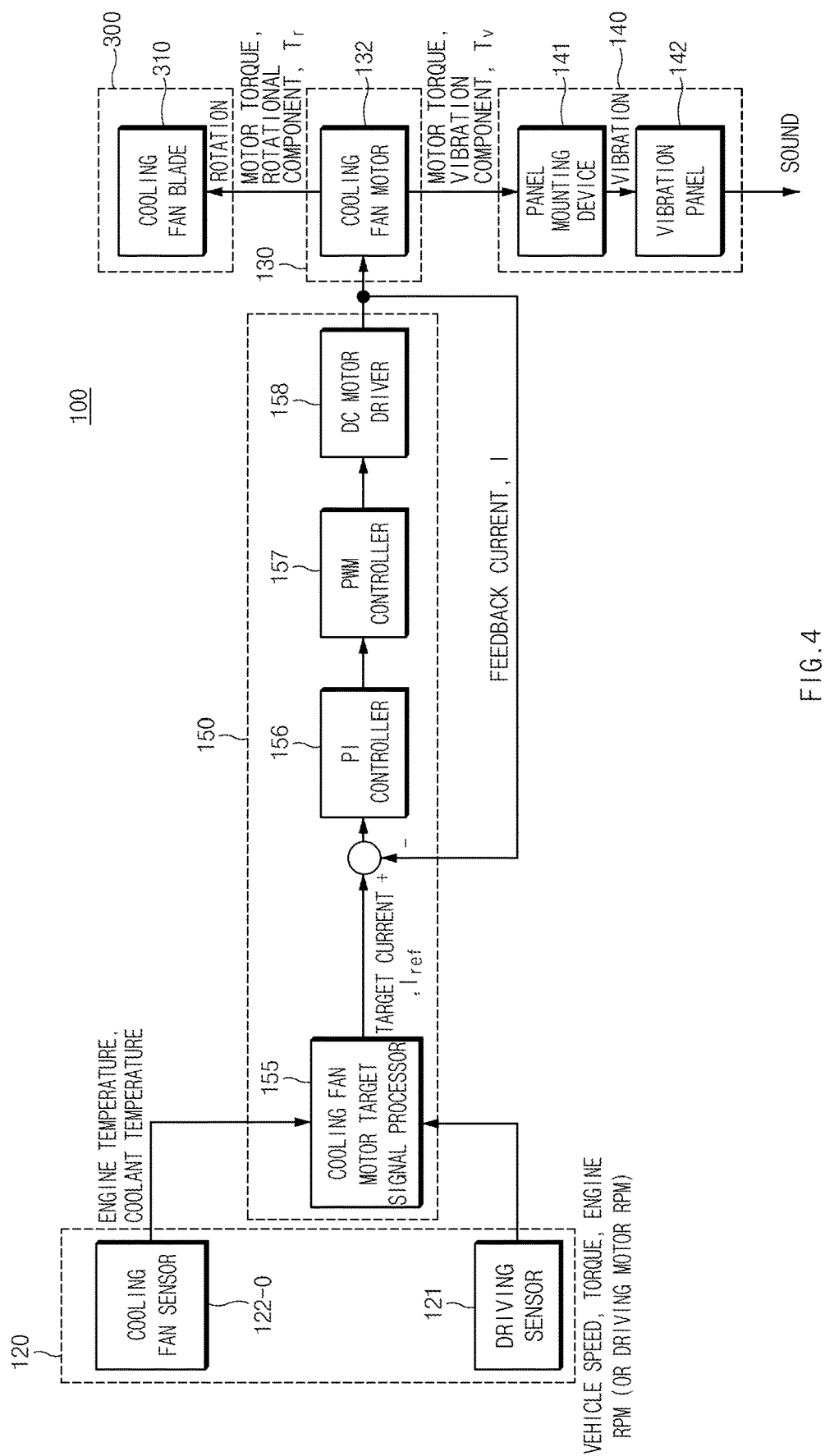
FIG. 4 is a view exemplarily illustrating the configuration of an apparatus of generating a sound of a vehicle and a signal flow thereof, according to various exemplary embodiments of the present invention.

FIG. 4 is a view exemplarily illustrating the configuration of an apparatus of generating the sound of a vehicle and a signal flow thereof, according to various exemplary embodiments of the present invention.

As illustrated in FIG. 4, according to various exemplary embodiments of the present invention, the apparatus 100 for generating the sound of the vehicle may include a controller 150 which determines a target current (Iref) based on cooling fan operating information acquired from the cooling fan sensor 122-0 and driving information acquired from the driving sensor 121, a cooling fan motor 132 driven, as the target current is applied, the sound output device 140, which outputs a target sound, as the torque of the vibration component from the cooling fan motor 132 is applied, and the cooling fan driving device 300 which drives the cooling fan as the torque of the rotational component of the cooling fan motor 132 is applied.

The controller 150 may include a cooling fan motor target signal processing device 155 which outputs a target current (Iref) based on the cooling fan operating information and the driving information, a PI controller 156 which performs a PI (Proportional and integral control) control operation for a value obtained by subtracting a feedback current (I) received from the cooling fan motor 131 from the target current, a Pulse Width Modulation (PWM) controller 157 which changes the pulse width of the current obtained by subtracting the feedback current from the target current to convert the amount of a current to drive the motor (cooling motor), and a DC motor driver 158 which determines a target driving current of the motor (cooling motor) based on the target current having a changed pulse width, and outputs the determined target driving current to the motor (cooling motor). A cooling motor target signal processor 155 will be described in more detail with reference to FIG. 5.

Figure 5:
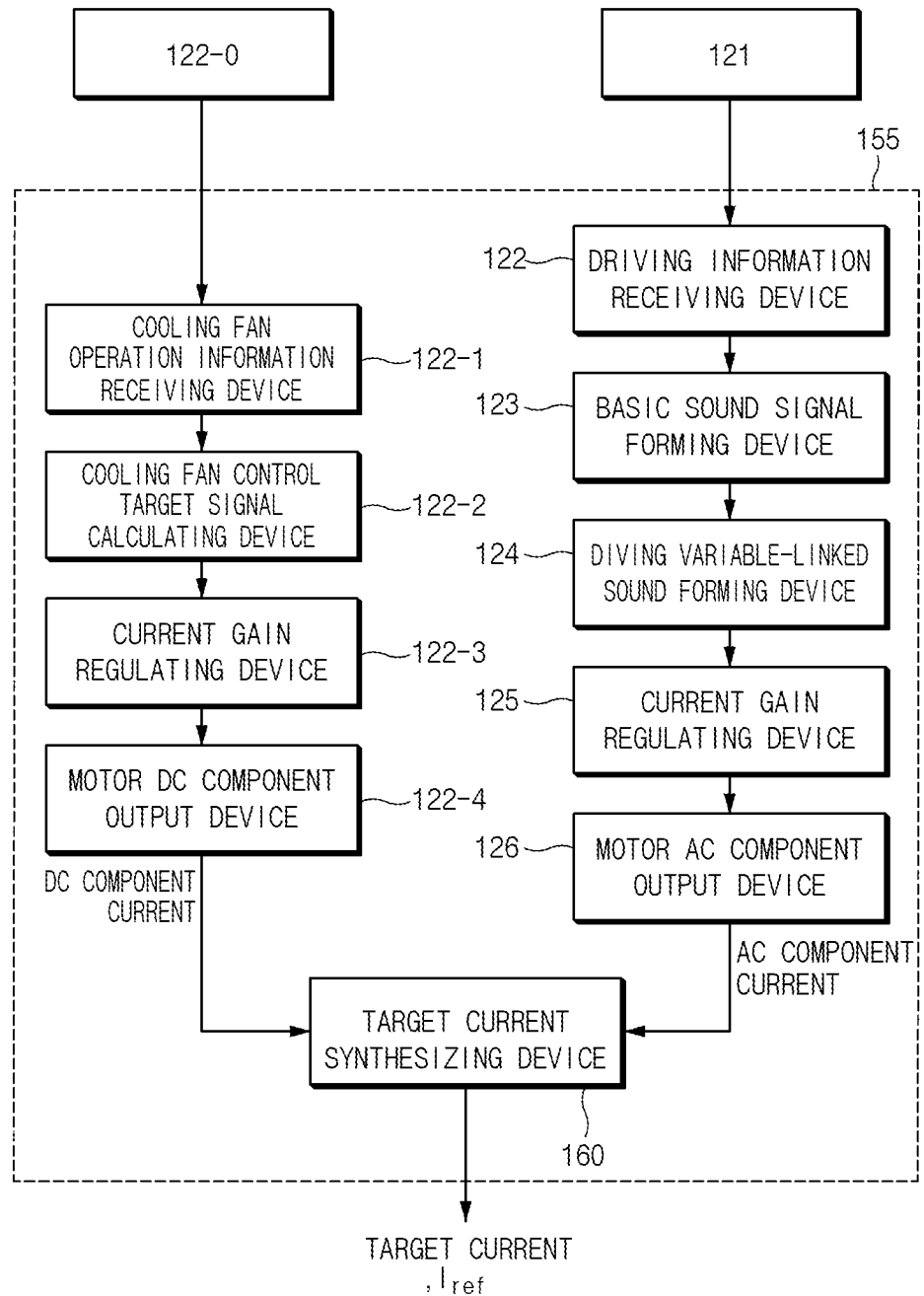
FIG. 5 is a view exemplarily illustrating the configuration of a cooling fan motor target signal processor and a signal flow thereof, according to various exemplary embodiments of the present invention.

FIG. 5 is a view exemplarily illustrating the configuration of a cooling fan motor target signal processor and a signal flow thereof, according to various exemplary embodiments of the present invention.

As illustrated in FIG. 5, the cooling fan motor target signal processor 155 may generate a first signal for generating the torque of the rotational component of the motor (cooling fan motor), based on cooling fan operating information received from the cooling fan sensor 122-0, and may generate a second signal for generating the torque of the vibration component from the motor (cooling fan motor), based on the driving information acquired from the driving sensor 121. Furthermore, the cooling fan motor target signal processor 155 may generate a target current by synthesizing the first signal and the second signal.

The cooling fan motor target signal processor 155 may include a cooling fan operating information receiving device 122-1, which receives the cooling fan operating information obtained from the cooling fan sensor 122-0, a cooling fan control target signal calculating device 122-2, which determines a target signal for controlling a cooling fan to vary the rotation speed of the cooling fan depending on the cooling fan operating information (e.g., an engine temperature), a current gain regulating device 122-3, which regulates a current gain to amplify the output current, and a motor DC component output device 122-4, which outputs a direct current (DC) component of the current, and may generate the first signal by use of the above components. In the instant case, the motor DC component output device 122-4 may automatically extract the DC component when the noise is not involved in a target value. However, when the noise is involved in the target value, a low-pass filter is added to output a current having a DC component.

Furthermore, the cooling fan motor target signal processor 155 may include a driving information receiving device 122, which receives driving information (a vehicle speed, a torque, or an engine RPM (or a motor RPM)) from the driving sensor 121, the basic sound signal forming device 123, which forms a basic sound signal based on the driving information, the diving variable-linked sound forming device 124, which forms a variable sound signal based on the basic sound signal, the current gain regulating device 125, which regulates a current gain to amplify an output current, and the motor AC component output device 126, which outputs an Alternative Current (AC) component of the current, and may generate the second signal using the above-described components. In the instant case, the motor AC component output device 126 may automatically extract the AC component when the noise is not involved in the target value. However, when the noise is involved in the target value, a high-pass filter is added to output a current having an AC component. The basic sound signal forming device 123 and the diving variable-linked sound forming device 124 will be described later in more detail with reference to FIG. 6 and FIG. 7.

Furthermore, the cooling fan motor target signal processor 155 may include the target current synthesizing device 160 which generates the target current by synthesizing the first signal and the second signal.

Figure 6:
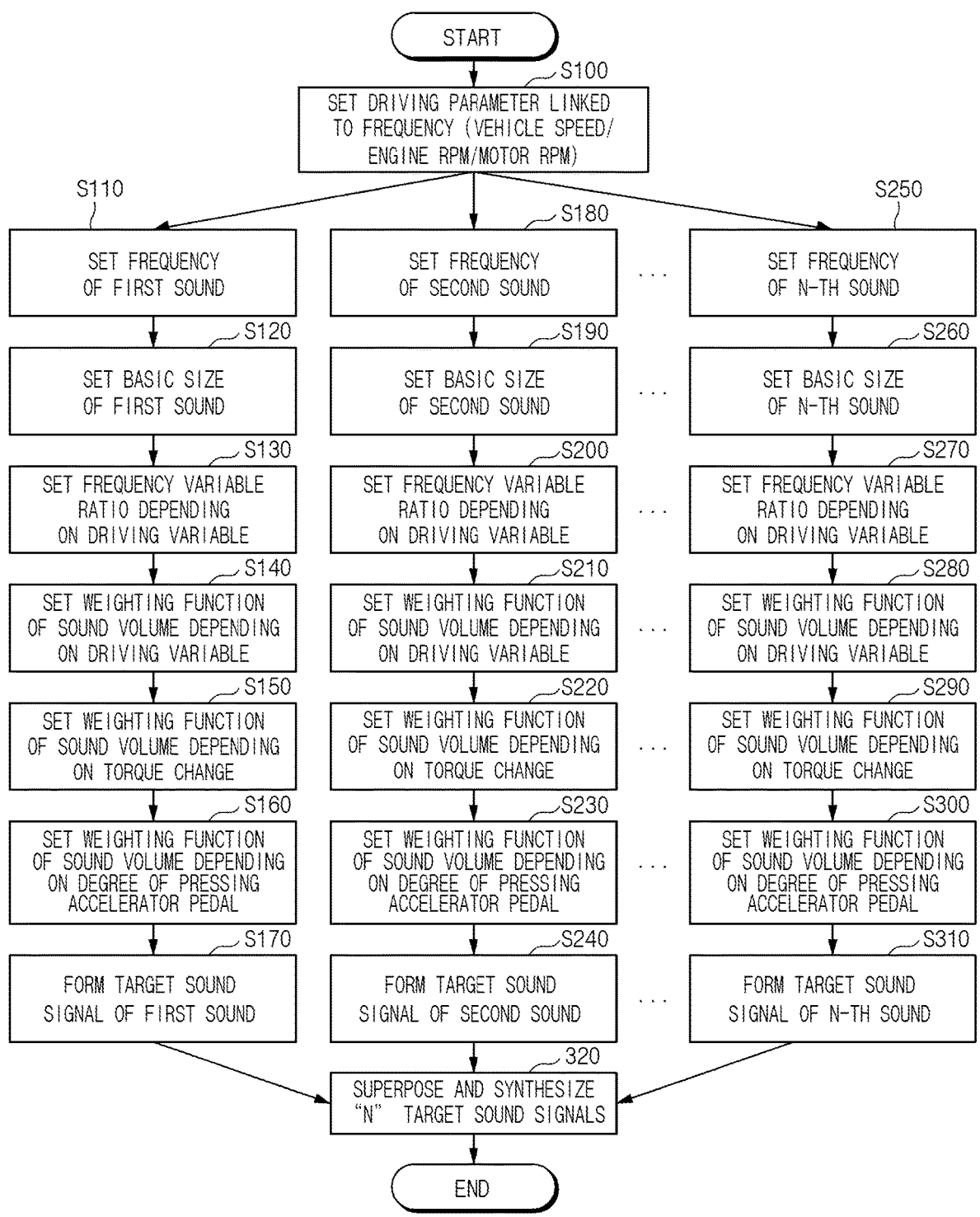
FIG. 6 is a view exemplarily illustrating a method for generating a variable sound signal, according to various exemplary embodiments of the present invention.
Figure 7A:
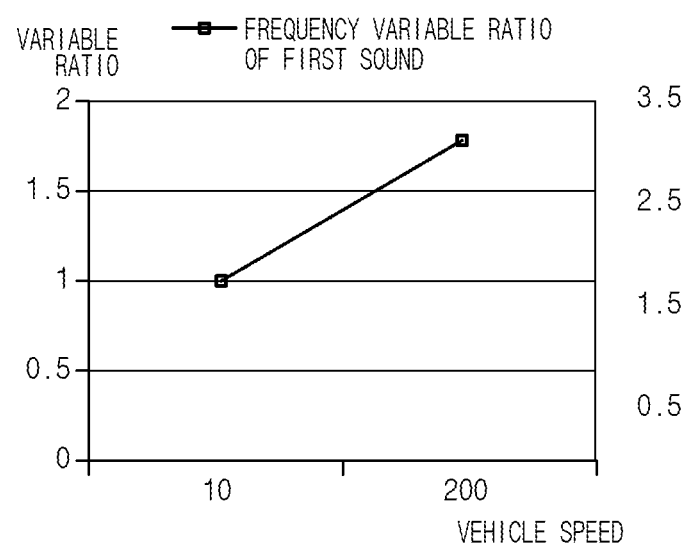
FIG. 7A is a graph illustrating a frequency variable ratio.
Figure 7B:
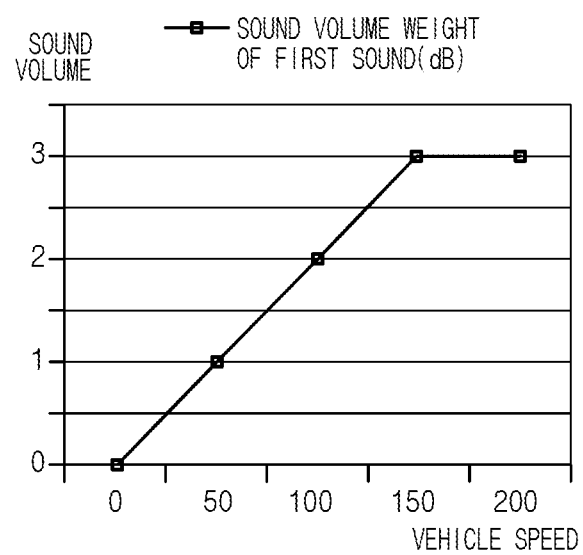
FIG. 7B is a graph illustrating a sound volume weighted depending on a vehicle speed.
Figure 7C:
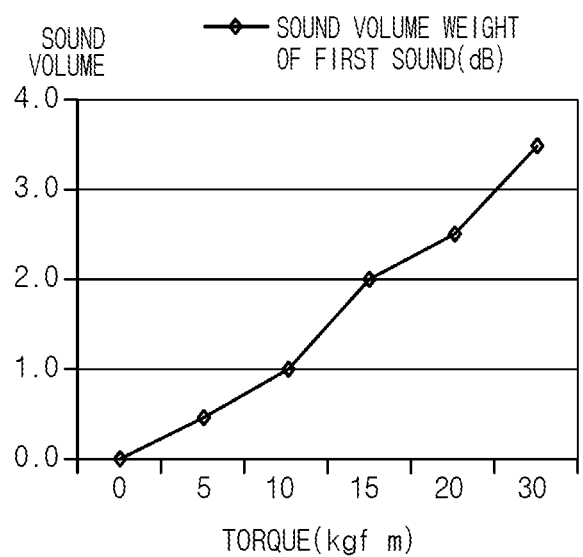
FIG. 7C is a graph illustrating a sound volume weighted depending on a torque.
Figure 7D:
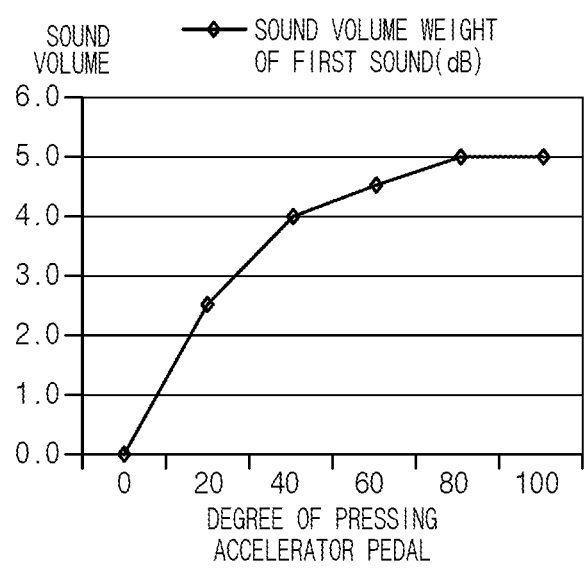
FIG. 7D is a view exemplarily illustrating a sound volume weighted depending on a degree of pressing an accelerator pedal.

FIG. 6 is a view exemplarily illustrating a method for generating a variable sound signal, according to various exemplary embodiments of the present invention, FIG. 7A is a graph illustrating a frequency variable ratio, FIG. 7B is a graph illustrating a sound volume weighted depending on a vehicle speed, FIG. 7C is a graph illustrating a sound volume weighted depending on a torque, and FIG. 7D is a view exemplarily illustrating a sound volume weighted depending on a degree of pressing an accelerator pedal. In the instant case, the various sound signal is formed based on the basic sound signal. Accordingly, a manner of generating a signal of a variable sound will be described with reference to FIG. 6 and FIG. 7A, FIG. 7B, FIG. 7C, and FIG. 7D, while focusing on the operations of the basic sound signal forming device 123 and the diving variable-linked sound forming device 124.

As illustrated in FIG. 6, the basic sound signal forming device 123 may set a driving variable, which is to be linked to a frequency (the pitch of a target sound) of the target sound, of the driving information (S100). In the instant case, the driving variable may include one of a vehicle speed, an engine RPM, and a motor RPM. Furthermore, the basic sound signal forming device 123 may make settings by dividing the number of tone colors of the target sound by "n", and may set the basic frequency and the basic size of each tone color.

For example, the basic sound forming device 123 may set a basic frequency and a basic size of a first sound of the ton colors of the target sound (S110 and S120), may set a basic frequency and a basic size of a second sound (S180 and S190), and may set a basic frequency and a basic size of a n-th sound (S250 and S260).

The diving variable-linked sound forming device 124 may set a variable ratio of a frequency depending on the driving variable for each of "n" tone colors (S130, S200, and S270). According to various exemplary embodiments of the present invention, the diving variable-linked sound forming device 124 may set frequency variable ratios for the minimum value and the maximum value of the driving variable. For example, when the driving variable may be set to the vehicle speed, and when the basic frequency is 100 HZ in the basic sound signal forming device 123, the variable ratio may be set to 1 at the minimum value of the vehicle speed, and may be set to 1.8 at the maximum value of the vehicle speed. Accordingly, as illustrated in FIG. 7A, when the vehicle speed has the minimum value, the frequency of the target sound may be set to 100 HZ. When the vehicle speed has the maximum value, the frequency of the target sound may be set to 180 Hz. Furthermore, as illustrated in FIG. 7A, the diving variable-linked sound forming device 124 may set the variable ratio by linearly mapping the variable ratio to a value between the minimum value and the maximum value of the driving variable such that the frequencies of "n" tone colors are varied depend on the sizes of the driving variables.

When the frequency variable ratios for the "n" tone colors are set, the diving variable-linked sound forming device 124 may set a volume weighting function depending on the driving variable for each of "n" tone colors, a volume weighting function depending on a torque change, and a weighting function of a sound volume depending on the degree of pressing the accelerator pedal (S140, S150, S160, S210, S220, S230, S280, S290, and S300).

For example, as illustrated in FIG. 7B, when the weighting function of the sound volume is set depending on the driving variable (vehicle speed), the diving variable-linked sound forming device 124 may weigh the sound volume up to 3 dB when the vehicle speed is increased (for example, 150 kph or more). Furthermore, as illustrated in FIG. 7C, when the weighting function of the sound volume is set depending on the torque, the diving variable-linked sound forming device 124 may weigh the sound volume up to 3 dB when the torque is increased(for example, 25 kgfm or more). Furthermore, as illustrated in FIG. 7D, when the weighting function of the sound volume is set depending on the degree of pressing the accelerator pedal, the diving variable-linked sound forming device 124 may weigh the sound volume up to 5 dB when the degree of pressing the accelerator pedal is 80% or more.

The diving variable-linked sound forming device 124 may form a target sound signal for each of "n" tone colors based on one of a surrounding frequency variable ratio, the weighting function of the sound volume depending on the driving variable, the weighting function of the sound volume depending on a torque change, or the weighting function of the sound volume depending on the degree of pressing the accelerator pedal (S170, S240, and S310).

The diving variable-linked sound forming device 124 may generate a variable sound signal by synthesizing the target sound signals for the "n" tone colors (S320).

Figure 8:
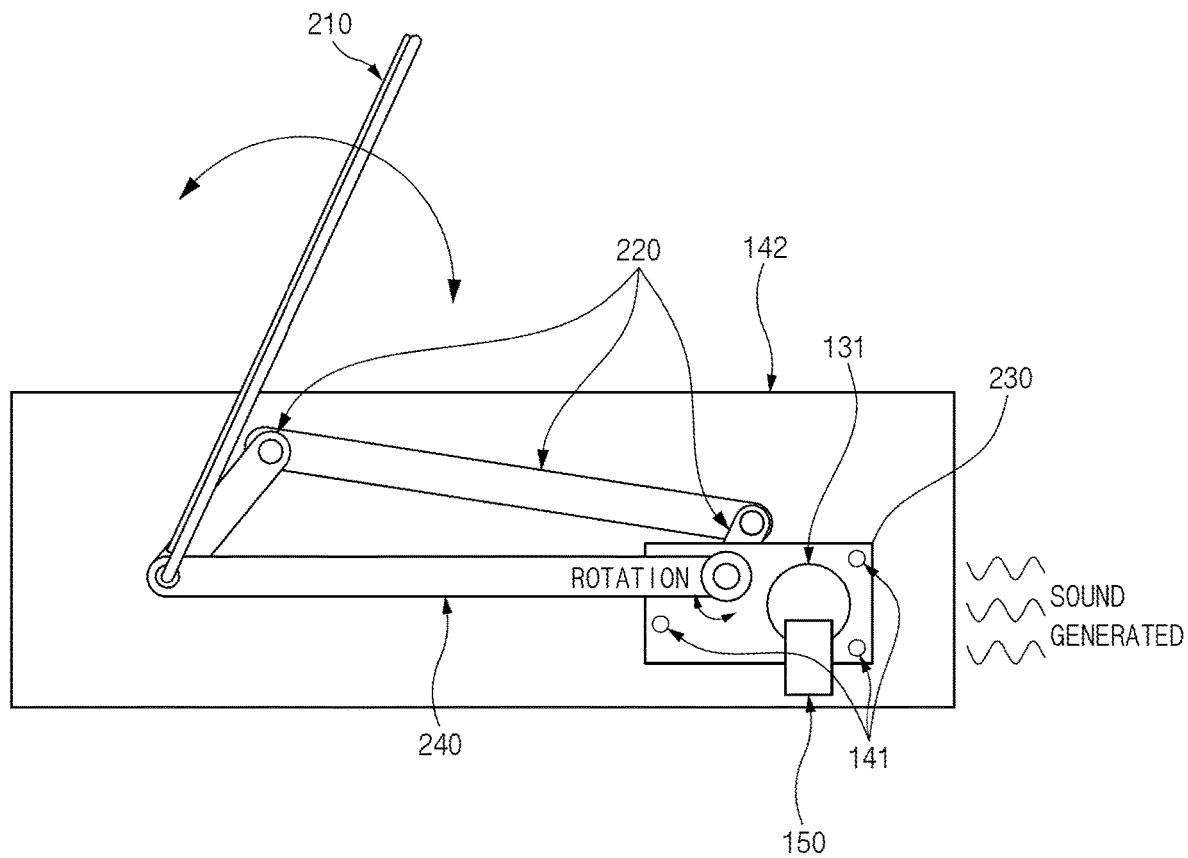
FIG. 8 is a schematic view exemplarily illustrating an apparatus of generating a sound of a vehicle, according to various exemplary embodiments of the present invention.

FIG. 8 is a schematic view exemplarily illustrating an apparatus of generating a sound of a vehicle, according to various exemplary embodiments of the present invention.

As illustrated in FIG. 8, when the target driving current of the wiper motor, which is determined by the controller 150 in the apparatus 100 for generating the sound of the vehicle, is applied, the wiper motor 131 may generate the torque of the rotational component and the torque for the vibration component. In the instant case, the torque of the rotational component may be transmitted to the wiper gear box 230, and the torque transmitted to the wiper gear box 230 drives the rotation link 220 connected to the wiper gear box 230. As the rotation link 220 operates, the wiper 210 connected to the end portion of the rotation link 220 may operate. Furthermore, the torque of the vibration component may be transmitted to the panel mounting device 141, and the torque transmitted to the panel mounting device 141 vibrates the vibration panel 142 to generate the target sound.

Figure 9A:
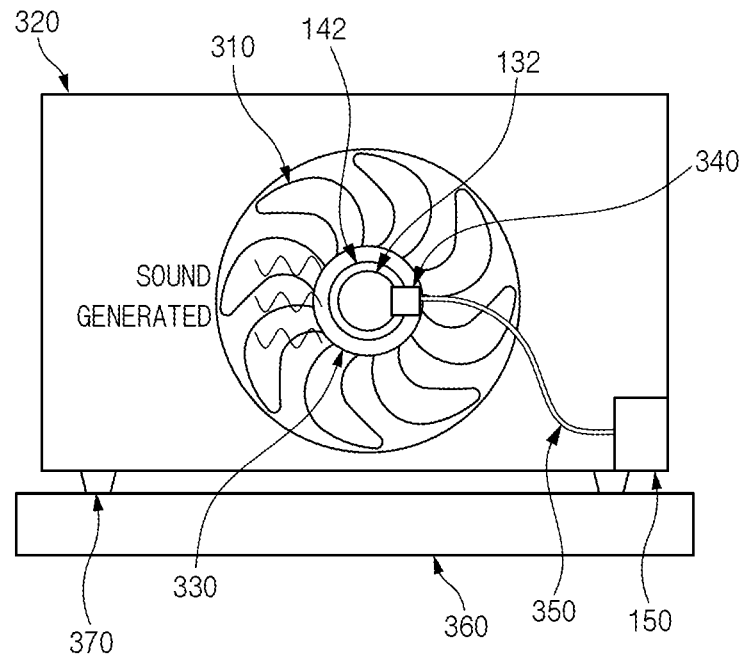
FIG. 9A and FIG. 9B are schematic views exemplarily illustrating an apparatus of generating a sound of a vehicle, according to various exemplary embodiments of the present invention.
Figure 9B:
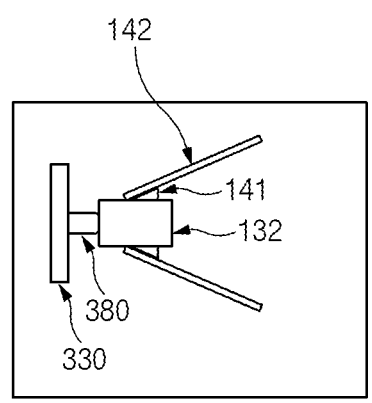

FIG. 9A and FIG. 9B are schematic views exemplarily illustrating an apparatus of generating a sound of a vehicle, according to various exemplary embodiments of the present invention.

As illustrated in FIG. 9A and FIG. 9B, when the target driving current of the cooling fan motor, which is determined by the controller 150 in the apparatus 100 for generating the sound of the vehicle, is applied to the cooling fan motor 132 after passing through the cooling fan connector 340 by the cooling fan cable 350, the cooling fan motor 132 may generate the torque of the rotational component and the torque of the vibration component. In the instant case, the torque of the rotational component rotates a motor rotor 380 and a cooling fan rotor 330 connected to the cooling fan motor 132, and may rotate a cooling fan blade 310 as the motor rotor 380 and the cooling fan rotor 330 rotate. Furthermore, the torque of the vibration component may be transmitted to the panel mounting device 141 connecting the cooling fan motor with the vibration panel 142, and the torque transmitted to the panel mounting device 141 vibrates the vibration panel 142 to generate the target sound.

The cooling fan motor 132 and the cooling fan blade 310 may be provided in the cooling fan case 320, and the cooling fan case 320 may be supported on the upper side of a lower member 360 of a front end module by a cooling fan mounting rubber 370.

FIG. 10, FIG. 11, and FIG. 12, and FIG. 13 are views exemplarily illustrating a method for generating a sound of a vehicle, according to various exemplary embodiments of the present invention.

Figure 10:
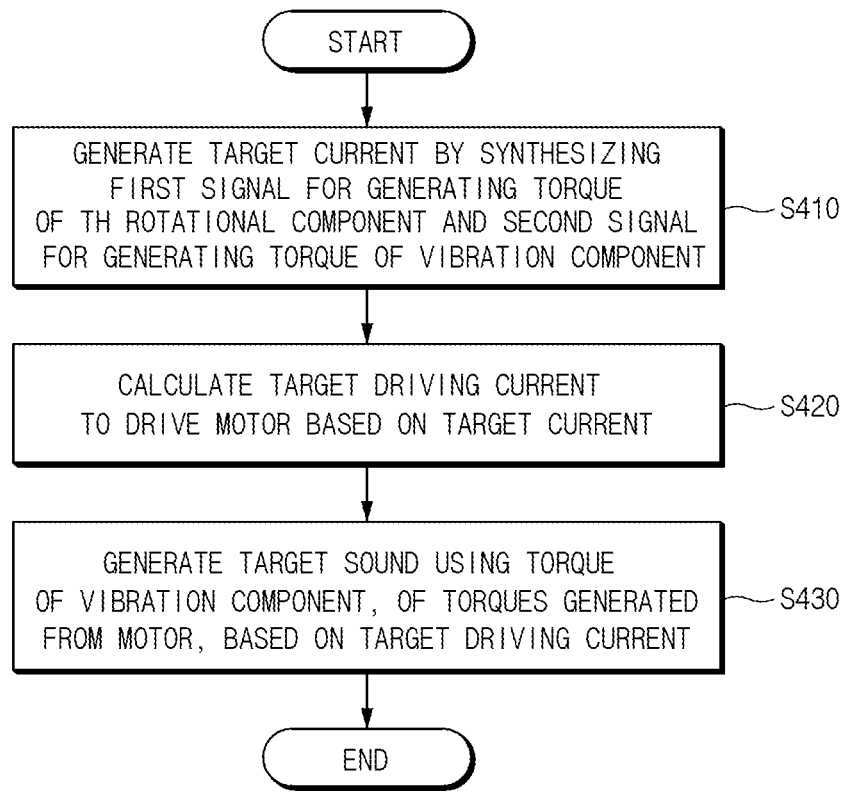
FIG. 10, FIG. 11, FIG. 12, and FIG. 13 are views exemplarily illustrating a method for generating a sound of a vehicle, according to various exemplary embodiments of the present invention.

As illustrated in FIG. 10, the controller 150 may generate the target current by synthesizing the first signal for generating torque of the rotational component and the second signal for generating the torque of the vibration component (S410). The details of S410 will be described in more detail with reference to FIG. 11 and FIG. 12.

The controller 150 may determine the target driving current to drive the motor based on the target current (S420). The details of S420 will be described in more detail with reference to FIG. 13.

The controller 150 may generate a target sound using the torque of the vibration component, of torques generated from the motor, based on the target driving current (S430).

Figure 11:
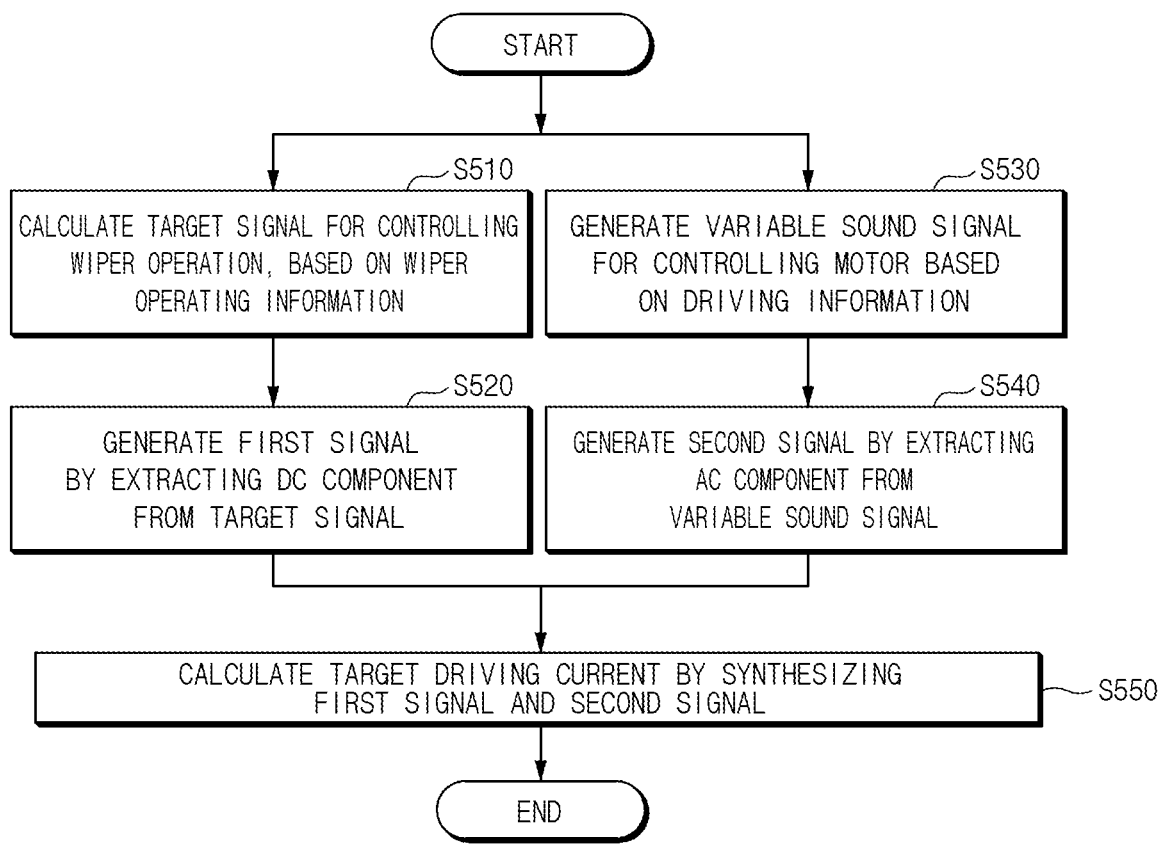

According to various exemplary embodiments of the present invention, the controller 150 determines a target signal for controlling the wiper operation, based on the wiper operating information, as illustrated in FIG. 11 such that the target driving current is determined (S510), and may generate the first signal by extracting a DC component from the target signal (S520).

Furthermore, the controller 150 generates the variable sound signal for controlling the motor based the driving information (S530), and may generate the second signal by extracting the AC component from the variable sound signal (S540). Furthermore, the controller 150 may determine the target driving current by synthesizing the first signal and the second signal (S550).

Figure 12:
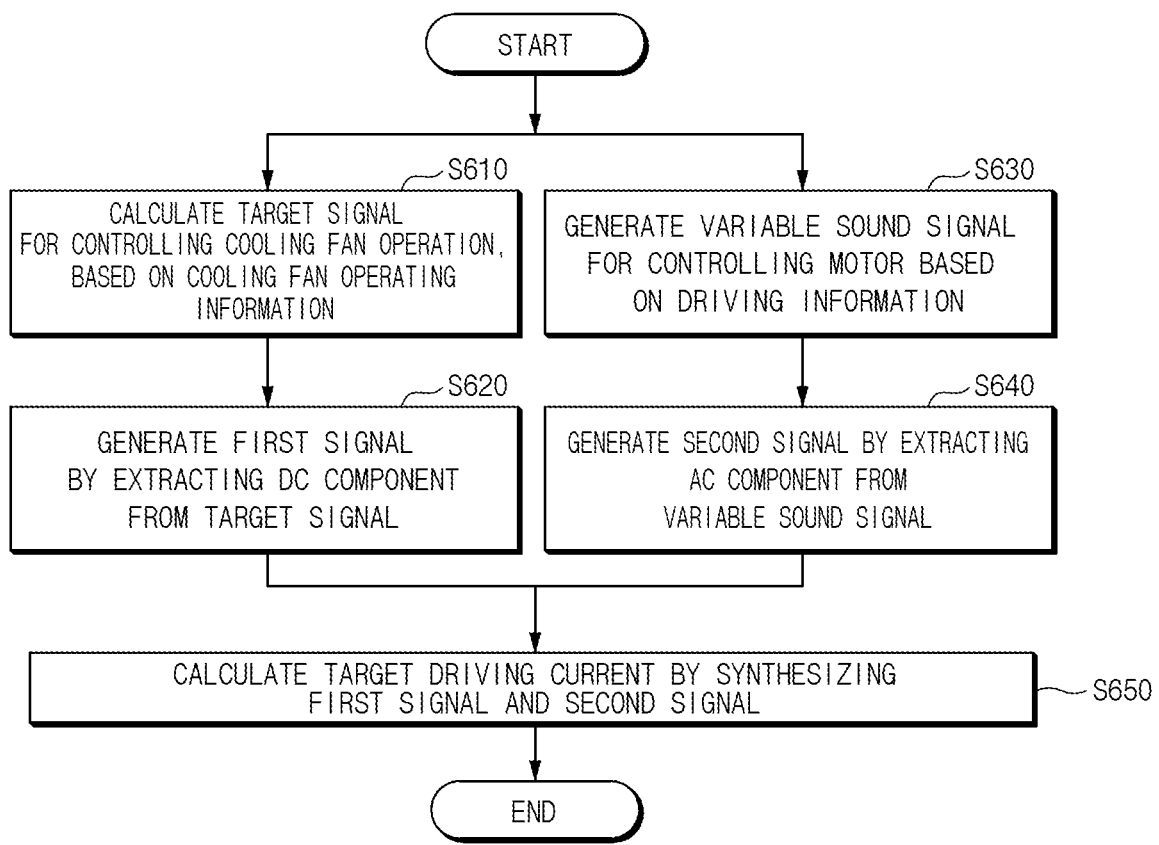

According to various exemplary embodiments of the present invention, the controller 150 determines a target signal for controlling the cooling fan operation based on the cooling fan operating information, as illustrated in FIG. 12 such that the target driving current is determined (S610), and may generate the first signal by extracting a DC component from the target signal (S620).

Furthermore, the controller 150 generates the variable sound signal for controlling the motor based on the driving information (S630), and may generate the second signal by extracting the AC component from the variable sound signal (S640). Furthermore, the controller 150 may determine the target driving current by synthesizing the first signal and the second signal (S650).

The details of the operation of generating the variable sound signal in S530 of FIG. 11 and S630 of FIG. 12 may be understood by making reference to the description made with reference to FIG. 6 and FIG. 7.

Figure 13:
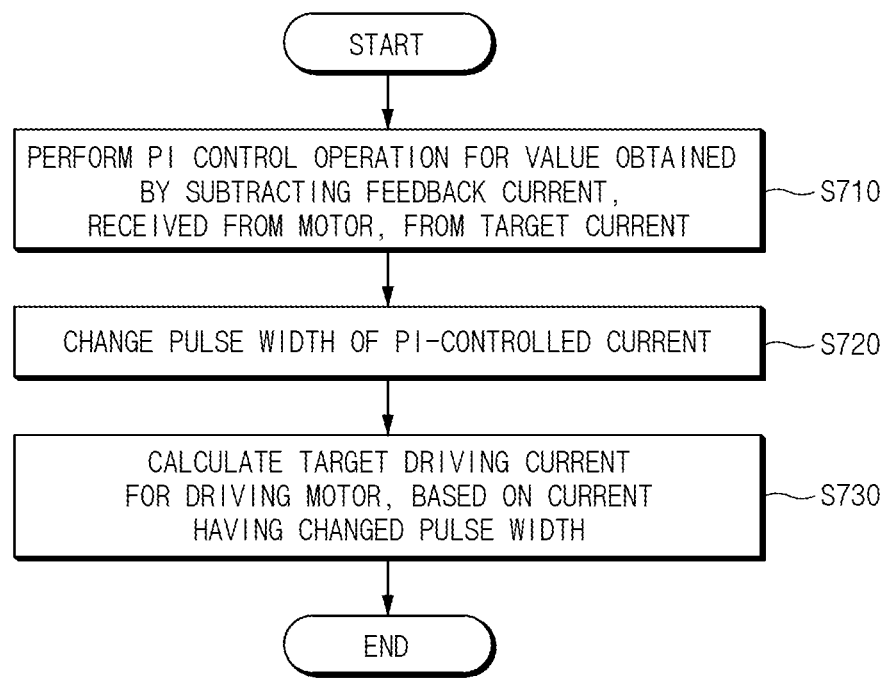

As illustrated in FIG. 13, the controller 150 may perform the PI control operation for a value obtained by subtracting the feedback current received from the motor from the target current (S710), may change the pulse width of the PI-controlled current (S720), and may determine a target driving current for driving the motor, based on a current having the changed pulse width (S730).

According to various exemplary embodiments of the present invention, in the apparatus and the method for generating the sound of the vehicle, various virtual engine sounds may be generated without increasing the weight or the costs of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of generating a sound of a vehicle, the apparatus comprising:
   a motor configured to generate a torque of a rotational component and a torque of a vibration component, according to a target driving current;
   a controller connected to the motor and configured to generate a target current by synthesizing a first signal for generating the torque of the rotational component and a second signal for generating the torque of the vibration component, and to determine the target driving current for driving the motor according to the target current; and
   a sound output device coupled to the motor and configured to generate a target sound by the torque of the vibration component.

2. The apparatus of claim 1, wherein the controller includes:
   a target signal processor configured to output the target current;
   a proportional and integral (PI) controller engaged to the target signal processor and configured to perform a PI control operation for a value obtained by subtracting a feedback current, which is received from the motor, from the target current generated by the target signal processor;
   a pulse width modulation (PWM) controller engaged to the PI controller and configured to change a pulse width of a current subject to the PI control operation; and
   a motor driver engaged to the PWM controller and configured to determine the target driving current for driving the motor, according to the current having the changed pulse width, and to output the determined target driving current to the motor.

3. The apparatus of claim 2, wherein the target signal processor is configured to determine a target signal for controlling an operation of a wiper, according to wiper operating information, and to generate the first signal by extracting a direct current (DC) component from the target signal.

4. The apparatus of claim 2, wherein the target signal processor is configured to determine a target signal for controlling an operation of a cooling fan, according to cooling fan operating information, and to generate the first signal by extracting a direct current (DC) component from the target signal.

5. The apparatus of claim 2, wherein the target signal processor is configured to generate a variable sound signal for controlling the motor according to driving information, and to generate the second signal by extracting an alternating current (AC) component from the variable sound signal.

6. The apparatus of claim 5, wherein the target signal processor includes:
a basic sound signal forming device configured to set a driving variable, which is to be linked to a frequency of the target sound, of the driving information, to set a number of tone colors of the target sound to "n", and to set a basic frequency and a basic size of each tone color; and
a diving variable-linked sound forming device configured to set frequency variable ratios for a minimum value and a maximum value of the driving variable, to form "n" target sound signals for the "n" tone colors, according to one of the frequency variable ratios, a sound volume weighting function depending on the driving variable, a sound volume weighting function depending on a torque change, and a sound volume weighting function depending on a degree of pressing an accelerator pedal, and to generate the variable sound signal by synthesizing the "n" target sound signals.

7. The apparatus of claim 6, wherein the driving variable includes:
one of a vehicle speed, an engine revolutions per minute (RPM), and a motor RPM.

8. The apparatus of claim 7, wherein when the vehicle speed is the driving variable, the frequency variable ratios to values between the minimum value and the maximum value of the driving variable are linearly mapped.

9. The apparatus of claim 1, wherein the motor operates a wiper or a cooling fan according to the torque of the rotational component.

10. A method of generating a sound of a vehicle, the method comprising:
generating, by a controller, a target current by synthesizing a first signal for generating a torque of a rotational component and a second signal for generating a torque of a vibration component;
determining, by the controller, a target driving current for driving a motor according to the target current; and
generating, by a sound output device, a target sound according to the torque of the vibration component among the torque of the rotational component and the torque of the vibration component, which are generated from the motor according to the target driving current.

11. The method of claim 10, wherein the generating of the target current includes:
determining a target signal for controlling an operation of a wiper, according to wiper operating information; and
generating the first signal by extracting a DC component from the target signal.

12. The method of claim 10, wherein the generating of the target current includes:
determining a target signal for controlling an operation of a cooling fan, according to cooling fan operating information; and
generating the first signal by extracting a DC component from the target signal.

13. The method of claim 10, wherein the generating of the target current includes:
generating a variable sound signal for controlling the motor, according to driving information; and
generating the second signal by extracting an AC component from the variable sound signal.

14. The method of claim 13, wherein the generating of the variable sound signal includes:
setting a driving variable, which is to be linked to a frequency of the target sound, of the driving information;
setting a number of tone colors of the target sound to "n";
setting a basic frequency and a basic size of each tone color;
setting frequency variable ratios for a minimum value and a maximum value of the driving variable;
forming "n" target sound signals for the "n" tone colors, according to one of the frequency variable ratios, a sound volume weighting function set depending on the driving variable, a sound volume weighting function depending on a torque change, and a sound volume weighting function depending on a degree of pressing an accelerator pedal; and
generating the variable sound signal by synthesizing the "n" target sound signals.

15. The method of claim 13, wherein the driving variable includes:
one of a vehicle speed, an engine RPM, and a motor RPM.

16. The method of claim 15, wherein when the vehicle speed is the driving variable, the frequency variable ratios to values between the minimum value and the maximum value of the driving variable are linearly mapped.

17. The method of claim 10, wherein the determining of the target driving current includes:
performing a PI control operation for a value obtained by subtracting a feedback current, which is received from the motor, from the target current
changing a pulse width of a current subject to the PI control operation; and
determining the target driving current for driving the motor, according to the current having the changed pulse width.

18. The method of claim 10, further including:
operating a wiper or a cooling fan due to the torque of the rotational component.

19. A non-transitory computer readable storage medium on which a program for performing the method of claim 10 is recorded.

* * * * *